(12) United States Patent
Kaneko

(10) Patent No.: US 10,489,894 B2
(45) Date of Patent: Nov. 26, 2019

(54) IMAGE PROCESSING DEVICE, IMAGE PROCESSING METHOD, AND PROGRAM RECORDING MEDIUM

(71) Applicant: NEC Corporation, Minato-ku, Tokyo (JP)

(72) Inventor: Eiji Kaneko, Tokyo (JP)

(73) Assignee: NEC CORPORATION, Tokyo (JP)

( * ) Notice: Subject to any disclaimer, the term of this patent is extended or adjusted under 35 U.S.C. 154(b) by 44 days.

(21) Appl. No.: 15/573,526

(22) PCT Filed: May 24, 2016

(86) PCT No.: PCT/JP2016/002499
§ 371 (c)(1),
(2) Date: Nov. 13, 2017

(87) PCT Pub. No.: WO2016/189853
PCT Pub. Date: Dec. 1, 2016

(65) Prior Publication Data
US 2018/0130189 A1 May 10, 2018

(30) Foreign Application Priority Data

May 28, 2015 (JP) .................................. 2015-108124

(51) Int. Cl.
*G06K 9/00* (2006.01)
*G06T 5/00* (2006.01)
(Continued)

(52) U.S. Cl.
CPC .............. *G06T 5/008* (2013.01); *G06T 5/007* (2013.01); *G06T 5/40* (2013.01); *H04N 1/56* (2013.01);
(Continued)

(58) Field of Classification Search
CPC . G06T 2207/10024; G06T 2207/10032; G06T 5/007; G06T 5/008; G06T 5/40; H04N 1/56; H04N 21/2146
See application file for complete search history.

(56) References Cited

U.S. PATENT DOCUMENTS 8,170,282 B1 * 5/2012 Roskovensky ...... G06K 9/0063
367/118
2006/0126959 A1 * 6/2006 Padwick .............. G06K 9/0063
382/254
(Continued)

FOREIGN PATENT DOCUMENTS

JP 2007-018387 A 1/2007
JP 2010-251958 A 11/2010
(Continued)

OTHER PUBLICATIONS

N. G. Silleos et al., "Vegetation Indices: Advances Made in Biomass Estimation and Vegetation Monitoring in the Last 30 Years", Geocarto International, Dec. 2006, vol. 21, No. 4, pp. 21-28, Taylor & Francis, UK.
(Continued)

*Primary Examiner* — Bhavesh M Mehta
*Assistant Examiner* — Ian L Lemieux

(57) ABSTRACT

Provided is an image processing device including: an image read-in unit 51 which reads in one or more observation images which retain observation results from one or a plurality of wavelength regions; a reflection-absorption band region deletion unit 52 which deletes, from each of one or more of the observation images, observation results with respect to a reflection-absorption band region, and generates reflection-absorption band-deleted images; a coefficient constituent proportional value computation unit 53 which, using the reflection-absorption band-deleted images, derives a proportional value of a coefficient constituent for each wavelength band used in the observation; and a coefficient constituent deletion unit 54 which, on the basis of the obtained proportional values of the coefficient constituents for each of the wavelength bands, deletes the coefficient constituents from each of the observation values included in the one or more observation images, and generates illumination-corrected images.

8 Claims, 9 Drawing Sheets

(51) Int. Cl.
*H04N 1/56* (2006.01)
*G06T 5/40* (2006.01)
*H04N 21/214* (2011.01)

(52) U.S. Cl.
CPC ........... *G06T 2207/10024* (2013.01); *G06T 2207/10032* (2013.01); *H04N 21/2146* (2013.01)

(56) References Cited

U.S. PATENT DOCUMENTS

| | | | |
|---|---|---|---|
| 2010/0008595 A1* | 1/2010 | Riley | G06K 9/0063 382/254 |
| 2013/0050472 A1 | 2/2013 | Omer et al. | |
| 2014/0270332 A1* | 9/2014 | Pacifici | G06T 5/001 382/100 |
| 2015/0146980 A1* | 5/2015 | Itoh | G06K 9/4652 382/167 |
| 2015/0161768 A1* | 6/2015 | Ardouin | G06K 9/46 382/113 |
| 2015/0304524 A1* | 10/2015 | Toda | G06T 5/001 382/167 |
| 2019/0096048 A1* | 3/2019 | Kaneko | G06T 5/007 |

FOREIGN PATENT DOCUMENTS

| | | |
|---|---|---|
| JP | 2013-225243 A | 10/2013 |
| JP | 2015-036850 A | 2/2015 |

OTHER PUBLICATIONS

A. F. Wolf, "Using WorldView-2 Vis-NIR Multispectral Imagery to Support Land Mapping and Feature Extraction Using Normalized Difference Index Ratios", Dec. 2010, Fairborn, Ohio, 13 pages.
International Search Report for PCT Application No. PCT/JP2016/002499, dated Jul. 19, 2016.
English translation of Written opinion for PCT Application No. PCT/JP2016/002499.

* cited by examiner

IMAGE PROCESSING DEVICE, IMAGE PROCESSING METHOD, AND PROGRAM RECORDING MEDIUM

This application is a National Stage Entry of PCT/JP2016/002499 filed on May 24, 2016, which claims priority from Japanese Patent Application 2015-108124 filed on May 28, 2015, the contents of all of which are incorporated herein by reference, in their entirety.

TECHNICAL FIELD

The present invention relates to an image processing device, an image processing system, an image processing method, an environmental fluctuation component estimation method, and an image processing program to eliminate an environmental fluctuation component from an observation image which is obtained by observing an electromagnetic wave radiated from a measured object including the earth's surface.

BACKGROUND ART

A technique of observing the earth's surface from an aerial position (far from an observed object) by an observation device installed in an artificial satellite, an aircraft, or the like is generally referred to as remote sensing. In the remote sensing, an intensity of an electromagnetic wave such as light, which is radiated from a predetermined area on the earth's surface, is often observed.

In observation by the remote sensing, one observation value is often stored as a pixel value associated with a pixel. The pixel is one of a plurality of pixels constituting an image (observation image). For example, each of the observation values with respect to each point or each small area included in a predetermined area on the earth's surface is stored as the pixel value of the pixel associated with the point or the small area on the observation image. In this case, the observation image is an image in which each of pixels located at each position according to each point or each small area of the predetermined area holds the observation value. The observation value is obtained by observing an electromagnetic wave radiated from the earth's surface within the predetermined area. Note that, in the observation image, the pixel value is a value of the pixel located at a position depending on a position on the earth's surface within an observed area. Therefore, it may be said that each pixel value included in the observation image represents the observation value (such as the intensity of the electromagnetic wave radiated from each position) with respect to each position depending on the position on the earth's surface within the predetermined area.

In particular, when the observation device includes an image sensor, an observation result is often obtained in a form of image. In this case, the pixel value of each pixel included in the observation image may be a value (observation value) that represents an intensity of light incident on a light receiving element of the image sensor. The observation value includes information on light radiated from the earth's surface or the like and incident on the light receiving element of the image sensor. Note that the image sensor is also referred to as an imaging element, and the observation device is also referred to as an imaging device. In this case, the observation image is also referred to as a captured image. Further, in the following, the light radiated from the earth's surface and observed by the observation device may be referred to as observation light. When the observation device includes the image sensor, more specifically, the observation light is light incident on the light receiving element of the image sensor.

In addition, when the pixel value is a value representing brightness for each observed wavelength band, the value (the pixel value) representing the brightness is also expressed as a luminance value. The observation device may observe light of a specific wavelength included in a wavelength band of a specific range. For example, using a filter for selectively transmitting light of the wavelength included in the wavelength band of the specific range, the observation device is able to limit the wavelength band of the observation light. Further, using a plurality of filters having different light transmission wavelength bands, the observation device is able to obtain, as an observation result, an intensity of the observation light for each transmission wavelength band of the filter.

The observation image obtained as described above is used for various purposes such as discrimination of an object covering the earth's surface, observation of a state of the earth's surface, and the like, or is expected to be used. For example, as an application by which use of the observation image as described above is expected, farming support, searching for resources, and the like are exemplified. More specifically, an application of acquiring a state or a material of the covering object on the earth's surface, based on information on a surface reflectance of the covering object included, as the pixel value, in each pixel of the image obtained by remote sensing, and performing farming support, searching for resources, and the like, is expected. For example, in farming support and searching for resources, it is expected to acquire growth of crops or to discriminate minerals captured in the observation image, with use of the observation value held in the pixel of the observation image.

However, in order to obtain accurate information on the state of the earth's surface or the covering object on the earth's surface (e.g. crops, ores, and the like) from the observation image, it is necessary to estimate a component depending on an environmental condition, and to correct the observation value (pixel value). PTL 1 discloses a technique relating to technique of eliminating unnecessary information from the observation image, and extracting only necessary information. Further, PTL 2 discloses a technique of correcting image data such as an aerial image or a satellite image.

CITATION LIST

Patent Literature

[PTL 1] Japanese Laid-open Patent Publication No. 2013-225243

[PTL 2] Japanese Laid-open Patent Publication No. 2007-018387

Non Patent Literature

[NPL 1] Silleos, N. G., Alexandridis, T. K., Gitas, I. Z. and Perakis. K., "Vegetation Indices: Advances Made in Biomass Estimation and Vegetation Monitoring in the Last 30 Years", Geocarto International, Vol. 21, No. 4, December 2006

[NPL 2] A. F. Wolf, "Using WorldView-2 Vis-NIR Multispectral Imagery to Support Land Mapping and Feature Extraction Using Normalized Difference Index Ratios", Fairborn, Ohio, 2010

SUMMARY OF INVENTION

Technical Problem

Incidentally, it is known that an object reflects light having different intensity for each wavelength depending on a material or a state of a surface of the object. A light reflectance of an object for each wavelength is generally referred to as a surface reflectance.

The aforementioned observation image includes, as the observation value, information on a component depending on the environmental condition (hereinafter, referred to as an environmental fluctuation component) such as brightness of illumination by sunlight, and absorption and scattering by atmosphere, in addition to the information on surface reflection by an observation target. The following Eq. (1) is a formula expressing an influence of the environmental condition on the observation light.

$$L(\lambda)=\alpha(\lambda)R(\lambda)+\beta(\lambda) \quad (1)$$

where, $L(\lambda)$ represents the observation value of the observation light (value indicating an intensity of light) at a wavelength $\lambda$. Further, $R(\lambda)$ represents the surface reflectance of the object on the earth's surface as the observation target. As expressed in Eq. (1), the observation value obtained by remote sensing is expressed by the formula including the environmental fluctuation component such as the component depending on illumination by sunlight or an atmospheric transmittance, in addition to the surface reflectance $R(\lambda)$ by the observation target. Note that it is assumed that a relationship expressed in Eq. (1) is established with respect to the observation value observed at a certain wavelength. In Eq. (1), the environmental fluctuation component is $\alpha(\lambda)$ and $\beta(\lambda)$.

The intensity of illumination by sunlight, the atmospheric transmittance, light scattering by atmosphere and the like vary depending on the environmental condition such as a change in a solar altitude, a fluctuation of an atmospheric state, or the like. Therefore, it is necessary to accurately estimate and correct the environmental fluctuation component included in the observation light in order to obtain accurate information on the object on the earth's surface.

The environmental fluctuation components can be roughly classified into a coefficient component $\alpha(\lambda)$ being a component expressed as a coefficient term, and an addition component $\beta(\lambda)$ being a component expressed as an addition term with respect to the surface reflectance $R(\lambda)$ of the object on the earth's surface. Among these, for example, the coefficient component $\alpha(\lambda)$ is a component relating to the intensity of illumination by sunlight or the like, or the atmospheric transmittance with respect to the sunlight as the illumination light or the observation light (electromagnetic wave) being a reflection light of the sunlight. Further, the addition component $\beta(\lambda)$ is a component relating to an optical path luminance. Herein, the optical path luminance is related to the observation light which reaches the image sensor without mediating the object on the earth's surface, such as sunlight scattered by atmosphere. Note that the coefficient component $\alpha(\lambda)$ and the addition component $\beta(\lambda)$ may include a component other than the above.

FIG. 9 is an explanatory diagram illustrating a relationship between the observation light and the environmental fluctuation component expressed as the coefficient component and the addition component, in an aerial photographic image being the observation image. In the example illustrated in FIG. 9, the luminance value $L(\lambda)$ of the observation light is represented as a value obtained by adding the optical path luminance as the addition component $\beta(\lambda)$, to a component (reflection light from the earth's surface) obtained by multiplying the reflectance $R(\lambda)$ of the object on the earth's surface being a value inherent to the object on the earth's surface, by the coefficient component $\alpha(\lambda)$.

As described above, in order to obtain accurate information relating to the object on the earth's surface, it is necessary to calculate the environmental fluctuation component which does not depend on the object on the earth's surface, and then to eliminate the environmental fluctuation component from the observation light. Therefore, a technique of calculating the environmental fluctuation component with high accuracy is required.

For example, PTL 1 discloses a method for estimating an optical path luminance being the addition component $\beta(\lambda)$ by using the observation image associated with a plurality of wavelength bands. However, in the method described in PTL 1, only the atmospheric transmittance for each wavelength which is stored in advance is used regarding the coefficient component $\alpha(\lambda)$. PTL 1 fails to disclose a method for estimating the coefficient component $\alpha(\lambda)$ from the observation image.

Specifically, PTL 1 discloses a method for estimating and correcting the addition component $\beta(\lambda)$, in other words, a method for obtaining a value $L'(\lambda)$ expressed by a following Eq. (2). However, PTL 1 fails to disclose a method for further estimating the coefficient component $\alpha(\lambda)$ and obtaining a value $L''$ expressed by a following Eq. (3).

$$L'(\lambda)=\alpha(\lambda)R(\lambda) \quad (2)$$

$$L''(\lambda)=R(\lambda) \quad (3)$$

Note that in the present application, obtaining the value $L''(\lambda)$ expressed by the aforementioned Eq. (3) from the observation image or from the observation image after the addition component $\beta(\lambda)$ is eliminated is referred to as illumination correction, and an image representing a correction result is referred to as an illumination corrected image.

In view of the above, an object of the present invention is to provide an image processing device, an image processing system, an image processing method, an environmental fluctuation component estimation method, and an image processing program which enable to obtain the illumination corrected image having enhanced accuracy from the observation image, even when a value relating to the environmental fluctuation component such as the atmospheric transmittance for each wavelength is unknown.

Solution to Problem

An image processing device recited in the present invention includes:

an image reading unit that reads one or more observation images holding an observation result of an observation target area with respect to one or a plurality of wavelength bands, the observation result being represented as a pixel value of a pixel associated with a position in the observation target area;

a reflection absorption band area elimination unit that eliminates the observation result related to a reflection absorption band area and generating a reflection absorption band elimination image, the reflection absorption band area being an area which includes an observed object having a reflection band or an absorption band within an observation wavelength band;

a coefficient component proportional value calculation unit that calculates a proportional value of a coefficient component for each the wavelength band used for observation of the one or more observation images, the coefficient component being a component which is included in an observation value by the observation with respect to the observation wavelength band and is proportional to a reflectance of the observed object and includes a component relating to at least one of illumination and an atmospheric transmittance; and a coefficient component elimination unit that eliminates the coefficient component from the observation value included in the observation image based on the proportional value of the coefficient component for each wavelength band, and generates an illumination corrected image.

An image processing system recited in the present invention includes:

an observation device that observes a predetermined area with respect to one or a plurality of wavelength bands and generates one or more observation images; and an image processing device that eliminates an environmental fluctuation component from the observation image generated by the observation device, wherein the image processing device includes:

an image reading unit that reads one or more observation images holding an observation result of an observation target area with respect to one or a plurality of wavelength bands, the observation result being represented as a pixel value of a pixel associated with a position in the observation target area;

a reflection absorption band area elimination unit that eliminates the observation result related to a reflection absorption band area from the observation image and generating a reflection absorption band elimination image, the reflection absorption band area being an area which includes an observed object having a reflection band or an absorption band within an observation wavelength band;

a coefficient component proportional value calculation unit that calculates a proportional value of a coefficient component for each the wavelength band used for observation of the one or more observation images, the coefficient component being a component which is included in an observation value by the observation with respect to the observation wavelength band and is proportional to a reflectance of the observed object and includes a component relating to at least one of illumination and an atmospheric transmittance; and a coefficient component elimination unit that eliminates the coefficient component from the observation value included in the observation image based on the proportional value of the coefficient component for each wavelength band, and generates an illumination corrected image.

An image processing method recited in the present invention includes:

reading one or more observation images holding an observation result of an observation target area with respect to one or a plurality of wavelength bands, the observation result being represented as a pixel value of a pixel associated with a position in the observation target area;

eliminating the observation result related to a reflection absorption band area from the observation image and generating a reflection absorption band elimination image, the reflection absorption band area being an area which includes an observed object having a reflection band or an absorption band within an observation wavelength band;

calculating a proportional value of a coefficient component for each the wavelength band used for observation of the one or more observation images, the coefficient component being a component which is included in an observation value by the observation with respect to the observation wavelength band and is proportional to a reflectance of the observed object and includes a component relating to at least one of illumination and an atmospheric transmittance; and eliminating the coefficient component from the observation value included in the observation image based on the proportional value of the coefficient component for each wavelength band, and generating an illumination corrected image.

An environmental fluctuation component estimation method recited in the present invention includes:

eliminating an observation result related to a reflection absorption band area from an observation image, the observation image holding an observation result by two or more different wavelength bands as a pixel value of a pixel associated with a position of an observation target area, the reflection absorption band area being an area including an observed object having a reflection band or an absorption band within an observation wavelength band;

calculating a proportional value of a coefficient component for each the wavelength band used for observation of the one or more observation images, the coefficient component being a component which is included in an observation value by the observation with respect to the observation wavelength band and is proportional to a reflectance of the observed object and includes a component relating to at least one of illumination and an atmospheric transmittance; and multiplying the proportional value of the coefficient component for each wavelength band by a predetermined coefficient depending on the observed object, and estimating a value of the coefficient component.

A computer readable program recording medium recited in the present invention recording a program causing a computer to execute:

reading one or more observation images holding an observation result of an observation target area with respect to one or a plurality of wavelength bands, the observation result being represented as a pixel value of a pixel associated with a position in the observation target area;

eliminating the observation result related to a reflection absorption band area from the observation image and generating a reflection absorption band elimination image, the reflection absorption band area being an area which includes an observed object having a reflection band or an absorption band within an observation wavelength band;

calculating a proportional value of a coefficient component for each the wavelength band used for observation of the one or more observation images, the coefficient component being a component which is included in an observation value by the observation with respect to the observation wavelength band and is proportional to a reflectance of the observed object and includes a component relating to at least one of illumination and an atmospheric transmittance; and eliminating the coefficient component from the observation value included in the observation image based on the proportional value of the coefficient component for each wavelength band, and generating an illumination corrected image.

Advantageous Effects of Invention

According to the present invention, it is possible to obtain the illumination corrected image having enhanced accuracy from the observation image, even when the value relating to the environmental fluctuation component is unknown.

DESCRIPTION OF EMBODIMENTS

Figure 1:
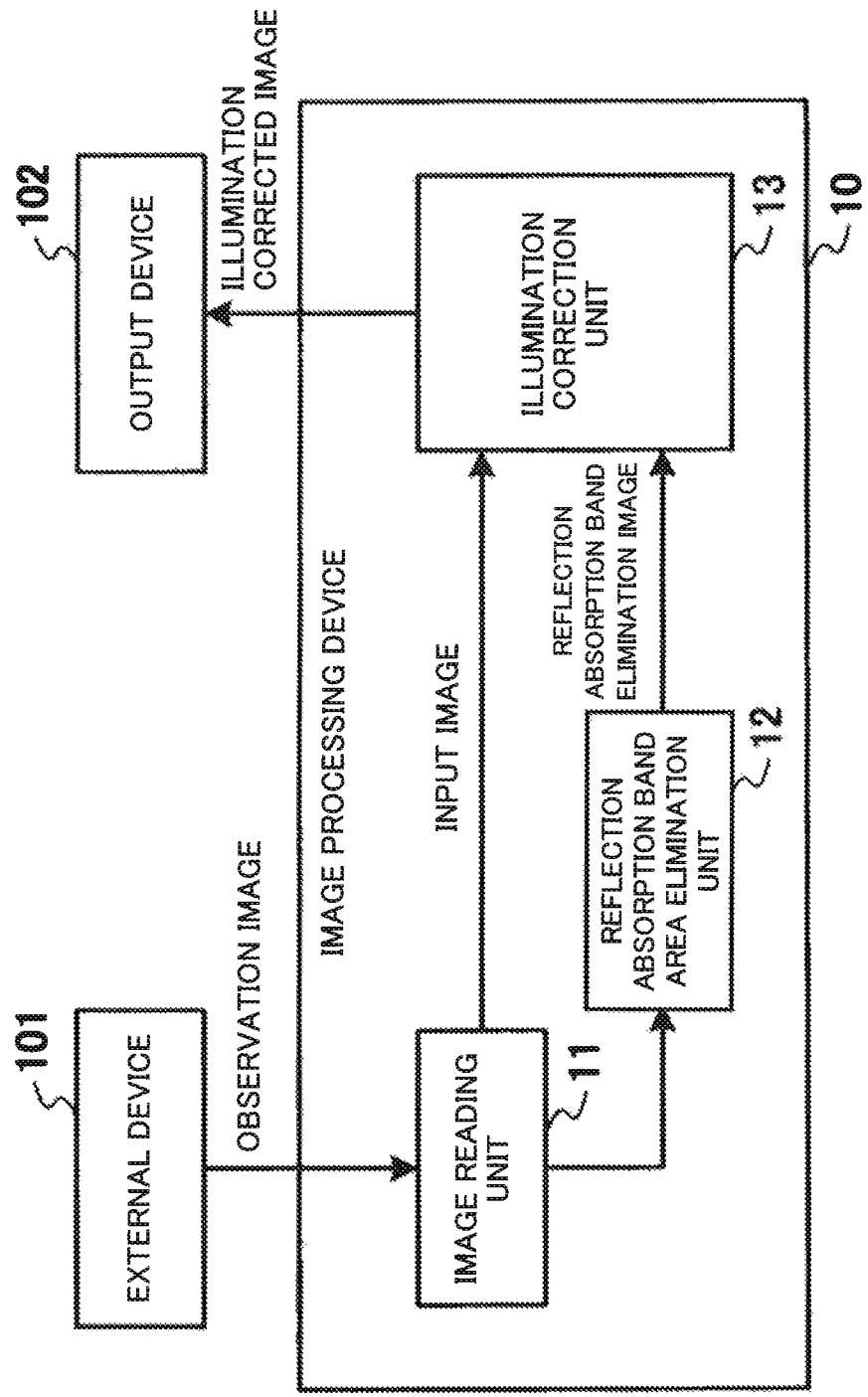
FIG. 1 is a block diagram illustrating a configuration example of an image processing device in a first example embodiment.

In the following, example embodiments of the present invention are described with reference to the drawings. In each of the following example embodiments, a method for stably and more accurately estimating the coefficient component $\alpha(\lambda)$, specifically, out of the environmental fluctuation components is described.

When the addition component $\beta(\lambda)$ estimated by a predetermined method is subtracted from each observation value included in the observation image, it is conceived that a correction value to be obtained is only a value relating to a reflection light component from the earth's surface from the relationship expressed by the aforementioned Eq. (1). Herein, when it is assumed that histograms of the reflectance of the object on the earth's surface with respect to a plurality of wavelength bands are same without depending on the wavelength band, it is possible to estimate the coefficient component $\alpha(\lambda)$ by the following method. Specifically, the method is that a certain pixel in which a cumulative relative frequency satisfies a predetermined condition is extracted based on luminance value histograms for each wavelength band, which are obtained from an input image associated with the plurality of wavelength bands (e.g. the observation image in which the addition component $\beta(\lambda)$ is eliminated), and the coefficient component $\alpha(\lambda)$ is calculated based on the luminance of the pixel. For example, respective luminance value histograms of a red wavelength band $\lambda_R$, a green wavelength band $\lambda_G$, and a blue wavelength band $\lambda_B$, which are included in the input image, are generated, and luminance values at which cumulative relative frequencies exceed a predetermined value (e.g. 0.95) are respectively obtained from these histograms. Further, obtained luminance values are respectively set as coefficient component proportional values $\alpha_{est}(\lambda_R)$, $\alpha_{est}(\lambda_G)$, and $\alpha_{est}(\lambda_B)$ at red, green, and blue, and coefficient component values $\alpha(\lambda_R)$, $\alpha(\lambda_G)$, and $\alpha(\lambda_B)$ at red, green, and blue are determined based on these coefficient component proportional values.

Further, the illumination corrected image is generated by dividing the luminance values of red, green, and blue at each pixel of the input image with the obtained coefficient components $\alpha(\lambda_R)$, $\alpha(\lambda_G)$, and $\alpha(\lambda_B)$.

A feature of this method is that the luminance value histogram in the input image is generated for each of the observed wavelength band, the coefficient component value at the wavelength band in the input image is calculated with respect to the luminance value of the pixel extracted based on the histogram, and the illumination corrected image is generated. Note that this method is based on a premise that a condition that histograms concerning the reflectance of the earth's surface within an area as the observation target in a plurality of wavelength bands are same without depending on the wavelength band is established. In other words, in order to accurately estimate the coefficient component by this method, it is necessary to satisfy a condition that the pixel extracted based on the luminance value histogram includes the observed object having a fixed reflectance without depending on the wavelength band.

However, some observation images to be obtained by observing the earth's surface may not satisfy the aforementioned condition. For example, one such the observation image is an observation image of the earth's surface which is obtained by observing the area including a lot of vegetation having an extremely high reflectance in a near infrared wavelength band. For example, it is assumed that the plurality of observation images of the earth's surface are obtained by observing the aforementioned area in a plurality of wavelength bands. Further, when the plurality of observation images of the earth's surface associated with the plurality of wavelength bands obtained as described above are input, only the image in the near infrared wavelength band has many pixels having a high luminance value, as compared with the image in the wavelength band other than the above. When the pixel related to the cumulative relative frequency of being equal to a predetermined value in the histogram is extracted from the image, the extracted pixel may include the object on the earth's surface having the high reflectance only in the near infrared wavelength band. Consequently, there may be an issue of being unable to accurately calculate the coefficient component in the near infrared range, and to generate the accurate illumination corrected image.

In view of the above, in each of the following example embodiments, a step of eliminating a reflection absorption band area from the input image is added before a process of extracting the pixel using the histogram. The reflection absorption band area is an area that includes the observed object having a reflection band or an absorption band within an observation wavelength band. Note that when the reflectance of the object on the earth's surface has a same histogram without depending on the wavelength band, this step may be omitted.

First Example Embodiment

FIG. 1 is a block diagram illustrating a configuration example of an image processing device in the present example embodiment. An image processing device 10 illustrated in FIG. 1 includes an image reading unit 11, a reflection absorption band area elimination unit 12, and an illumination correction unit 13.

Further, the image processing device 10 is connected to an external device 101. The image processing device 10 and the external device 101 are mutually communicable. Further, the image processing device 10 is connected to an output device 102. The image processing device 10 and the output device 102 are mutually communicable.

The external device 101 may be an observation device, for example. This observation device observes an intensity of light radiated from a target area with use of a plurality of wavelength bands, and generates and outputs the image which holds the observation result as the pixel value. Alternatively, the external device 101 may be a storage device or a server device (hereinafter, these devices are generically referred to as an image providing device) such as a hard disk device which stores the observation image including the observation result by the aforementioned observation device. Further, for example, the output device 102 may be a server device, a display device to be connected via a network, or the like. The server device as the output device 102 may be an object identifying device for extracting information on a material or a state of a captured object from an image, or the image providing device for providing an image to the object identifying device, for example.

In the present example embodiment, an observation device observes the target area with use of N wavelength bands. Herein, N is a positive integer of 1 or more. The external device 101 provides the image processing device 10 with N observation images respectively associated with the wavelength bands used for observation, for example. The external device 101 may provide the image processing device 10 with N observation images, and wavelength band information associated with each of the observation images. The wavelength band information is a sensitivity value for each wavelength band of the image sensor used for observation, or an upper limit and a lower limit of the wavelength band.

The observation device observes an intensity distribution of light which is sunlight of being the illumination light reflected on the observation target and reached to the observation device, for example.

In each example embodiment of the present invention, light may include visible light, infrared light, and ultraviolet light. Herein, the visible light is light in a wavelength range from 400 nm to 750 nm, for example. Further, the ultraviolet light is light in a wavelength range from 10 nm to 400 nm, for example. Note that the ultraviolet light to be used for observation may be near ultraviolet light (wavelength range from 200 nm to 400 nm), or the near ultraviolet light in a part of the wavelength range (e.g. a wavelength of 350 nm or more). Further, the infrared light is light in a wavelength range from 750 nm to 10000 nm, for example. Note that the infrared light to be used for observation may be light of a near infrared wavelength (wavelength range from 750 nm to 1050 nm), short-wavelength infrared light (wavelength range from 1050 nm to 2500 nm), thermal infrared light (wavelength range from 2500 nm to 13000 nm), light including all these light components, or a part of these light components. The wavelength band (type) of light to be used for observation may be determined depending on a sensitivity of the sensor. The following is one example of a wavelength band of light to be used for observation.

1. Visible range
2. Further including a near infrared range
3. Further including a near ultraviolet range
4. Further including a short-wavelength infrared range
5. Further including a thermal infrared range Note that the aforementioned lights to be used for observation are examples, and the observation wavelength band is not limited to the above. For example, the observation device may use an electromagnetic wave which is not included in the visible light, the infrared light, and the ultraviolet light for observation, or may use only light of a specific part of the wavelength band, such as a red wavelength band and the near infrared wavelength band for observation. As will be described later, the light received by the observation device includes light which reflects or scatters with respect to a medium such as atmosphere and reaches the observation device, in addition to the light reaching the observation device from the observation target. The observation target of the observation device is the earth's surface which is the surface of the earth, for example. The observation device may be a camera which is loaded in an aircraft or an artificial satellite and is configured to observe brightness of the earth's surface from the sky in the plurality of wavelength bands different from each other, for example. In this case, the observation device needs only to perform observation with use of N band-pass filters which selectively transmit light of wavelength bands different from each other. Note that the observation device may observe a far-away area on the earth's surface from the earth's surface or from near the earth's surface, in addition to observing the earth's surface from the sky.

Further, a wavelength bandwidth may not be fixed. Generally, a sensor to detect a long wavelength band tends to broaden a wide bandwidth of observable light. As one example, in a case of a sensor for detecting light of a near ultraviolet to a near infrared wavelength, the bandwidth may be from about 10 nm to about 80 to 150 nm. In a case of a sensor for detecting light in a short-wavelength infrared range, the bandwidth may be about 200 to 250 nm. Further, in a case of a sensor for detecting light in a thermal infrared range having a wavelength longer than the aforementioned wavelengths, the bandwidth may be about 1000 nm. Note that these are only an example. Each wavelength bandwidth to be used for observation is not limited to the above.

The observation device outputs the observation result by N wavelength bands as N observation images. The image reading unit 11 may read N observation images obtained by observation by the external device 101. In the following, in the present example, it is assumed that each of N observation images is an image representing a brightness distribution of the target area, which is observed by one of N wavelength bands. A luminance value of each pixel included in each of the images indicates an intensity of light from a direction associated with a target pixel. These N observation images are images obtained by observing a same target i.e. a same area on the earth's surface, for example. In this case, N observation images may be N observation images obtained by a series of observation processes of observing the target area by the observation device with use of a sensor compatible with N wavelength bands, for example. Further, these N observation images may be images obtained by observing different target areas i.e. different areas on the earth's surface, as far as a value of the environmental fluctuation component (specifically, the coefficient component) such as an atmospheric reflectance is the same or substantially the same in all observation areas of each image. In this case, an administrator of the external device 101 or the image processing device 10 may select N observation images to be input out of some observation images, for example.

The image reading unit 11 stores each of N read observation images in association with wavelength band information used for observation of the observation image. Herein, associated wavelength band information may be a sensitivity value of an image sensor which performs observation at the wavelength band, or may be combination of an upper limit and a lower limit of a wavelength included in the wavelength band. Further, wavelength band information may be an identifier allocated to combination of an upper limit and a lower limit of a certain wavelength included in the wavelength band. In the following, these observation images to be read by the image reading unit 11 may be simply referred to as the input image.

The image reading unit 11 may read an observation image, in which the aforementioned addition component $\beta(\lambda)$ is negligibly small, or the observation image from which the addition component $\beta(\lambda)$ is already eliminated, for example. Alternatively, the image processing device 10 may include an optical path luminance correction unit (not illustrated) for estimating and eliminating the addition component $\beta(\lambda)$ from the input image on a post stage of the image reading unit 11. A method for correcting an optical path luminance by an optical path luminance correction unit may use the method described in PTL 1, for example.

Further, the image reading unit 11 may store, as measurement environment information, information relating to an observation condition in which the observation image is observed, such as the solar altitude at the time of observation, an observation year/month/day, an observation time, a latitude and a longitude of an observation target area, a topography of the observation target area, or an amount of water vapor and an amount of aerosol at the time of observation.

The reflection absorption band area elimination unit 12 determines whether an area including the observed object having the reflection band or the absorption band in the observation wavelength band presents in the input image. When the area related to the absorption band or the reflection band presents, the reflection absorption band area elimination unit 12 eliminates the luminance value of the pixel associated with the area. Herein, the reflection band is a wavelength band at which a phenomenon that a relatively high reflectance with respect to a certain wavelength band is obtained, as compared with a wavelength band other than the certain wavelength band occurs, or a phenomenon analogous to the aforementioned phenomenon occurs. Further, the absorption band is a wavelength band at which a phenomenon that a relatively high absorbance with respect to a certain wavelength band is obtained, as compared with a wavelength band other than the certain wavelength band occurs, or a phenomenon analogous to the aforementioned phenomenon occurs. Further, the observation wavelength band is all wavelength bands used for obtaining an observation value of the input image.

For example, the reflection absorption band area elimination unit 12 extracts, from input images respectively associated with N wavelength bands used for observation, luminance values being observation values by different wavelength bands associated with pixels having mutual correlation. When at least one of luminance values by the different wavelength bands is different from the luminance value by another one of the wavelength bands by a predetermined amount or more, the reflection absorption band area elimination unit 12 eliminates (invalidates) the luminance value of the target pixel and the luminance value of the pixel of another one of the input images having correspondence to the target pixel, based on an assumption that a target object located in an area associated with the target pixel does not have a substantially fixed reflectance without depending on a wavelength band, specifically, the target pixel is a pixel associated with the reflection absorption band area being an area including the target object having the absorption band or the reflection band. Herein, pixels having mutual correlation are, for example, pixels which hold observation values with respect to a same or a substantially same area on the earth's surface, or pixels which hold observation values with respect to an area where a reflectance of the observed object is regarded to be the same or substantially the same.

The reflection absorption band area elimination unit 12 extracts, from each of N input images, the luminance value of each of pixels included in the input image, specifically, the luminance value for each wavelength band, and obtains a standard deviation with respect to an extracted luminance value for each wavelength band, for example. When at least one of obtained standard deviations is different from an average by a predetermined amount or more (e.g. a difference two times or more of an average of standard deviations), the reflection absorption band area elimination unit 12 may eliminate the luminance value of the target pixel of each input image based on an assumption that the target pixel is a pixel associated with the reflection absorption band area. Further, for example, when a difference of the luminance value between wavelength bands adjacent to each other in the observation wavelength band is equal to or larger than a predetermined amount for each of pixels, the reflection absorption band area elimination unit 12 may eliminate the luminance value of the target pixel of each input image, based on an assumption that the target pixel has the absorption band or the reflection band in a part of the observation wavelength band.

Herein, eliminating the luminance value of a certain pixel in the input image means eliminating a difference in a frequency of the luminance value by a wavelength band in a histogram for each wavelength band to be used when the illumination correction unit 13 on a post stage extracts a specific luminance value for use in obtaining a proportional value of a coefficient component.

When an object having the reflection band or the absorption band is known in advance by a method other than a method for discriminating the reflection absorption band area, based on a variation of luminance values between wavelength bands, the reflection absorption band area elimination unit 12 may discriminate the reflection absorption band area by determining whether or not each pixel corresponds to an area including the object.

The reflection absorption band area elimination unit 12 may, for example, determine whether an area on the earth's surface associated with each pixel of the input image is an area including vegetation, and eliminate the luminance value of the pixel corresponding to a vegetation area.

Further, the reflection absorption band area elimination unit 12 may determine whether an area on the earth's surface includes an object on the earth's surface other than a water area, snow, and an artificial object, an object whose specular reflection light component is included in an observation value, or a part or all of these objects on the earth's surface, in place of vegetation. Further, the reflection absorption band area elimination unit 12 may determine whether an area on the earth's surface includes another arbitrary object on the earth's surface, in place of vegetation.

Determination as to whether the target pixel includes a vegetation area, in other words, a subject at the target pixel includes vegetation, or determination as to whether the target pixel includes another specific area i.e. another specific object on the earth's surface may be made by the following method, for example. Specifically, the reflection absorption band area elimination unit 12 extracts the luminance value $L_j(\lambda_R)$ being an observation value of a wavelength band corresponding to red light, and the luminance value $L_j(\lambda_{NIR})$ being an observation value of a wavelength band corresponding to near infrared light, out of j-th pixels of N input images, for example. Further, the reflection absorption band area elimination unit 12 calculates a normalized difference vegetation index (NDVI) $I_j$ expressed by the following Eq. (4), with use of the extracted luminance values $L_j(\lambda_R)$ and $L_j(\lambda_{NIR})$. Further, when a value of a calculated normalized difference vegetation index $I_j$ is larger than a predetermined value, the reflection absorption band area elimination unit 12 may determine that the j-th pixel corresponds to a vegetation area. By performing the aforementioned process for all pixels constituting the input image, determination may be made as to whether each pixel of the input image corresponds to a vegetation area.

[Mathematical expression 1]

$$I_j = \frac{L_j(\lambda_{NIR}) - L_j(\lambda_R)}{L_j(\lambda_{NIR}) + L_j(\lambda_R)} \quad (4)$$

Further, the reflection absorption band area elimination unit 12 may use SAVI (Soil Adjusted Vegetation Index), RVI (Ratio Vegetation Index), NRVI (Normalized Ratio Vegetation Index), TVI (Transformed Vegetation Index), CTVI (Corrected Transformed Vegetation Index), TTVI (Thiam's Transformed Vegetation Index) or EVI (Enhanced Vegetation Index) described in NPL 1, in place of a normalized difference vegetation index, for example. Further, the reflection absorption band area elimination unit 12 may use NDWI (Normalized Difference Water Index), NDSI (Normalized Difference Soil Index) or NHFD (Non-Homogeneous Feature Difference) described in NPL 2, in place of a normalized difference vegetation index, for example. Further, the reflection absorption band area elimination unit 12 may use an arbitrary index other than the aforementioned indices.

Further, the reflection absorption band area elimination unit 12 may determine, as a method for determining whether a certain pixel of the input image includes a specific object, whether each of pixels included in one observation image satisfies a condition relating to image information or a feature amount of the specific object registered in advance, whereby it is possible to determine whether the target pixel corresponds to an area including the specific object. As one example, there is a method, in which the pixel having the luminance value equal to or higher than a predetermined threshold value is determined to be the pixel associated with an area including vegetation, from the observation image having an observation result in a near infrared wavelength band.

The reflection absorption band area elimination unit 12 stores an image, in which the luminance value of the pixel corresponding to the reflection absorption band area is eliminated, as a reflection absorption band elimination image. A reflection absorption band elimination image may be stored in association with wavelength band information of the input image before elimination, for example.

For example, the reflection absorption band area elimination unit 12 may store an image having a value of zero stored therein as a value of the pixel, which is determined to be the reflection absorption band area, as the reflection absorption band elimination image for each input image. Note that a value to be stored in the pixel, which is determined to be the reflection absorption band area, may be a minus value or may be any other arbitrary value, for example.

The illumination correction unit 13 calculates $\alpha_{est}(\lambda)$ being a proportional value of a coefficient component (coefficient component proportional value) $\alpha(\lambda)$ for each wavelength band, with use of a reflection absorption band elimination image for each of N wavelength bands generated by the reflection absorption band area elimination unit 12, and corrects the input image based on the calculated $\alpha_{est}(\lambda)$.

Figure 2:
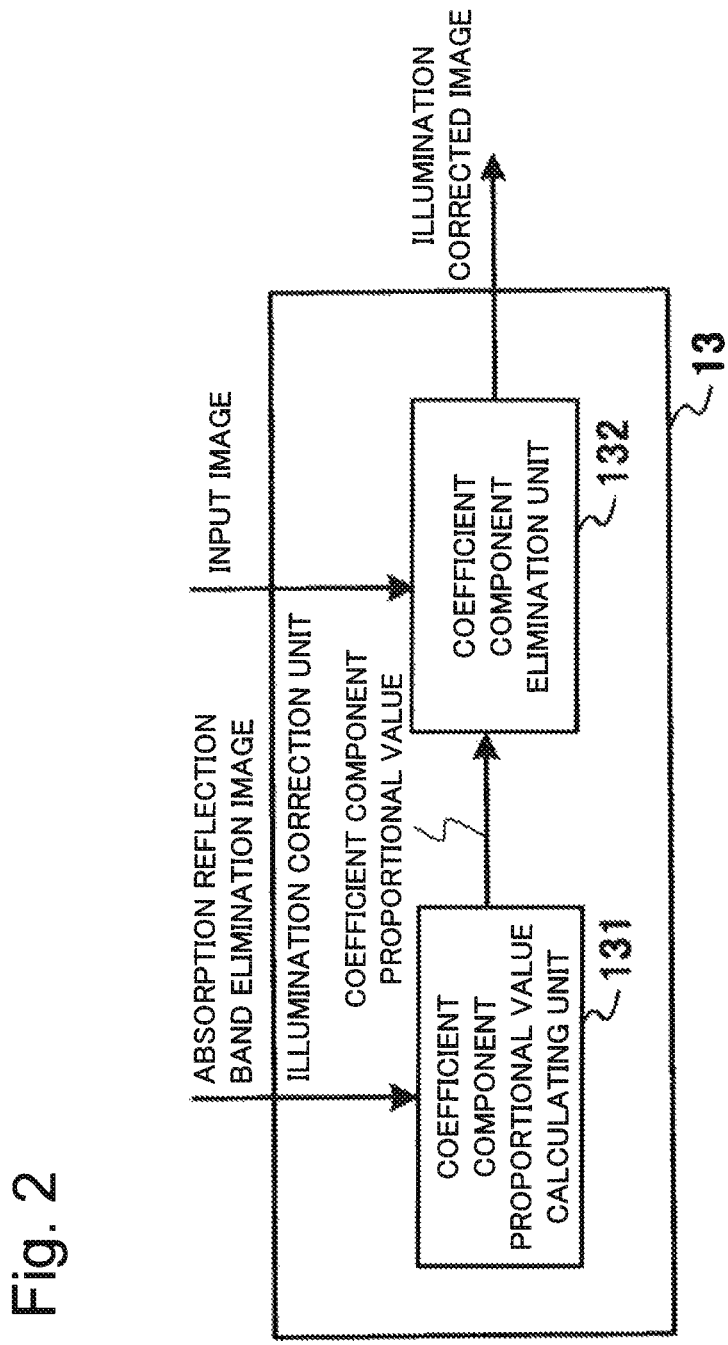
FIG. 2 is a block diagram illustrating a configuration example of an illumination correction unit.

FIG. 2 is a block diagram illustrating a configuration example of an illumination correction unit. As illustrated in FIG. 2, the illumination correction unit 13 may include a coefficient component proportional value calculating unit 131 and a coefficient component elimination unit 132.

The coefficient component proportional value calculating unit 131 generates the luminance value histogram with use of each of reflection absorption band elimination images for each of N wavelength bands, and calculates the coefficient component proportional value $\alpha_{est}(\lambda_k)$ for each wavelength band, based on a generated histogram, for example. The coefficient component proportional value calculating unit 131 may set the luminance value when a cumulative relative frequency exceeds a predetermined value in each of the histograms, as the coefficient component proportional value $\alpha_{est}(\lambda_k)$ at the wavelength band $\lambda_k$, for example. Herein, k is one of 1, ..., and N, and is associated with a wavelength band of the reflection absorption band elimination image from which a histogram is generated.

The coefficient component elimination unit 132 may multiply values of all pixels of the input image associated with a wavelength $\lambda_k$ by an obtained coefficient component proportion value $\alpha_{est}(\lambda_k)$ by assuming that $\alpha_{est}(\lambda_k)$ is a coefficient component value $\alpha_{est}(\lambda_k)$ as it is, and may set a result of the multiplication as an illumination corrected image, for example. Further, the coefficient component elimination unit 132 may set a value ($\gamma \cdot \alpha_{est}(\lambda_k)$), which is obtained by multiplying a predetermined coefficient $\gamma$ with $\alpha_{est}(\lambda_k)$, as a coefficient component value $\alpha(\lambda_k)$, for example. In this case, the coefficient component elimination unit 132 may multiply values of all pixels in the input image by $\alpha(\lambda_k)$, specifically, $\gamma \cdot \alpha_{est}(\lambda_k)$, and may set a result of the multiplication as an illumination corrected image. The coefficient $\gamma$ may be set to a different value depending on what object is included in the input image, for example.

The coefficient component proportional value calculating unit 131 may, for example, generate a histogram of the reflection absorption band elimination image as follows. Specifically, a process of calculating, from the reflection absorption band elimination image at a certain input wavelength band, the number of pixels having the luminance value in a certain range, and setting a value obtained by dividing a calculated pixel number with a total number of pixels of the reflection absorption band elimination image as a frequency is performed in an order in such a manner that the certain range covers a value range of luminance values of the reflection absorption band elimination image, and a frequency for each luminance value range, which is generated as a result of the execution, is set as a histogram.

Figure 3:
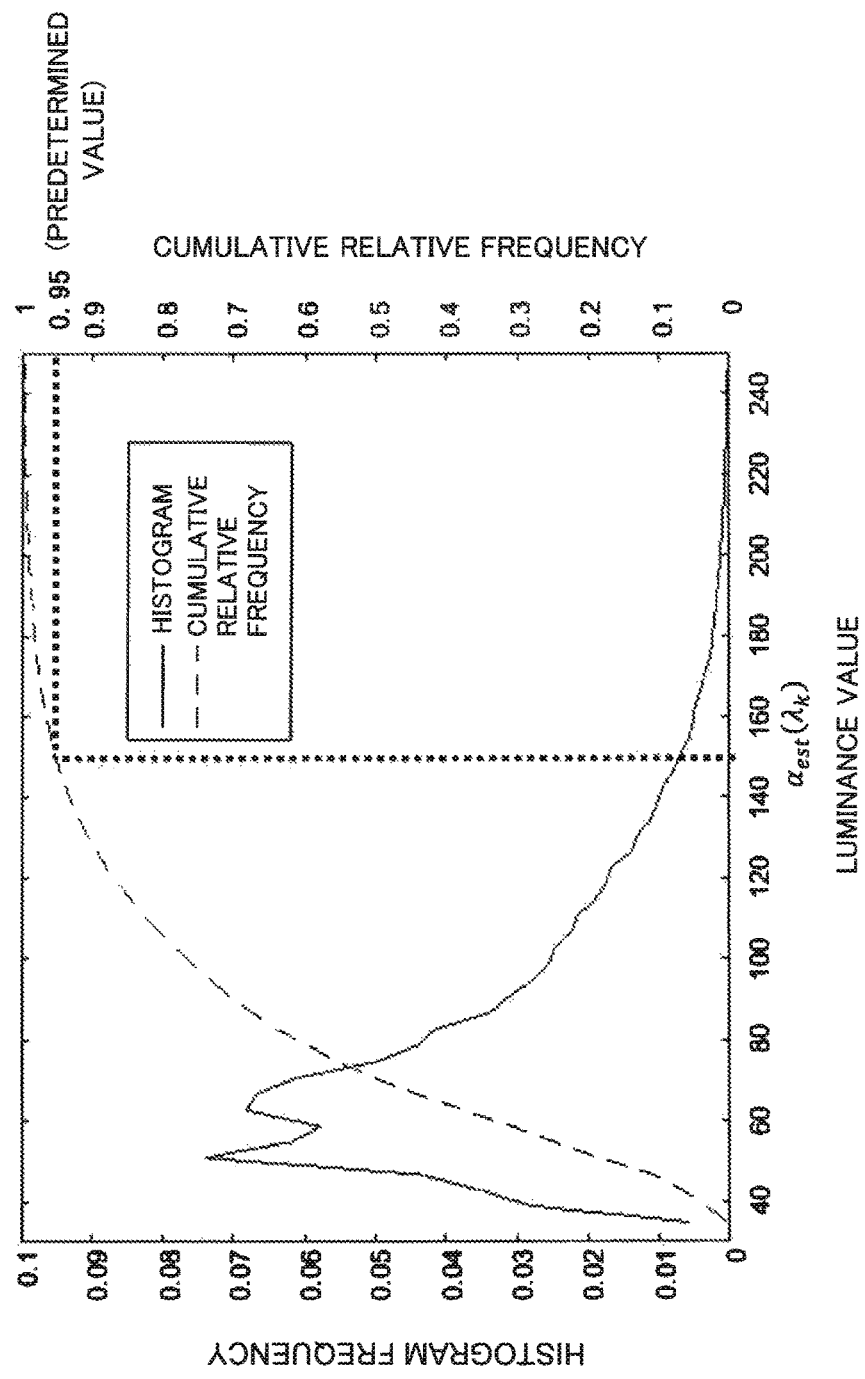
FIG. 3 is an explanatory diagram illustrating an example of a histogram of a reflection absorption band elimination image.

Further, ω is an explanatory diagram illustrating an example of a histogram of the reflection absorption band elimination image at a certain wavelength band $\lambda_k$. Note that in FIG. 3, in addition to a histogram, an example of an estimation result on a cumulative relative frequency of the histogram, and the coefficient component proportional value $\alpha_{est}(\lambda_k)$ is also illustrated. A cumulative relative frequency of a histogram is a cumulative sum of frequencies for each luminance area. As described in the present example, the coefficient component proportional value $\alpha_{est}(\lambda_k)$ may be the luminance value when a cumulative relative frequency in a histogram to be generated from the reflection absorption band elimination image at the wavelength band $\lambda_k$ is 0.95.

Preferably, a predetermined value (threshold value) with respect to the cumulative relative frequency set to a value at which the luminance value of the pixel (e.g. the pixel of white color) which maximally reflects illumination (sunlight) is extracted from the input image while avoiding specular reflection, for example. The predetermined value may be 0.9 or more, and more preferably, 0.95 or more, as far as the input image is a general observation image on the earth's surface. Note that when the predetermined value is set to 1, the luminance value of the pixel at which specular reflection occurs may be selected. Therefore, the predetermined value with respect to a cumulative relative frequency is preferably smaller than 1.

Further, as expressed by the following Eq. (5), the coefficient component elimination unit 132 divides a vector $L(\lambda_k)$ ($k=\{1, \ldots, N\}$) in which a luminance of each pixel is a component by a coefficient component value $\alpha(\lambda_k)$ to be determined based on an obtained coefficient component proportional value $\alpha_{est}(\lambda_k)$ with respect to each of N input images input by the image reading unit 11; and stores a result of the division $R(\lambda_k)$ as an illumination corrected image in association with the wavelength band $\lambda_k$. Further, the coefficient component elimination unit 132 outputs N illumination corrected images generated as described above to the output device 102.

[Mathematical expression 2]

$$\vec{R}(\lambda_j) = \frac{\vec{L}(\lambda_k)}{\alpha(\lambda_k)} \quad (5)$$

Note that as expressed by the following Eq. (6), the coefficient component elimination unit 132 divides a vector $L(\lambda_k)$ ($k=\{1, \ldots, N\}$) in which the luminance of each pixel is a component by the obtained coefficient component proportional value $\alpha_{est}(\lambda_k)$ for each of N input images stored by the image reading unit 11; and stores a result of the division $R(\lambda_k)$ as an illumination corrected image in association with the wavelength band $\lambda_k$. Note that this corresponds to a case where $\gamma=1$.

[Mathematical expression 3]

$$\vec{R}(\lambda_j) = \frac{\vec{L}(\lambda_k)}{\alpha_{est}(\lambda_k)} \quad (6)$$

Figure 4:
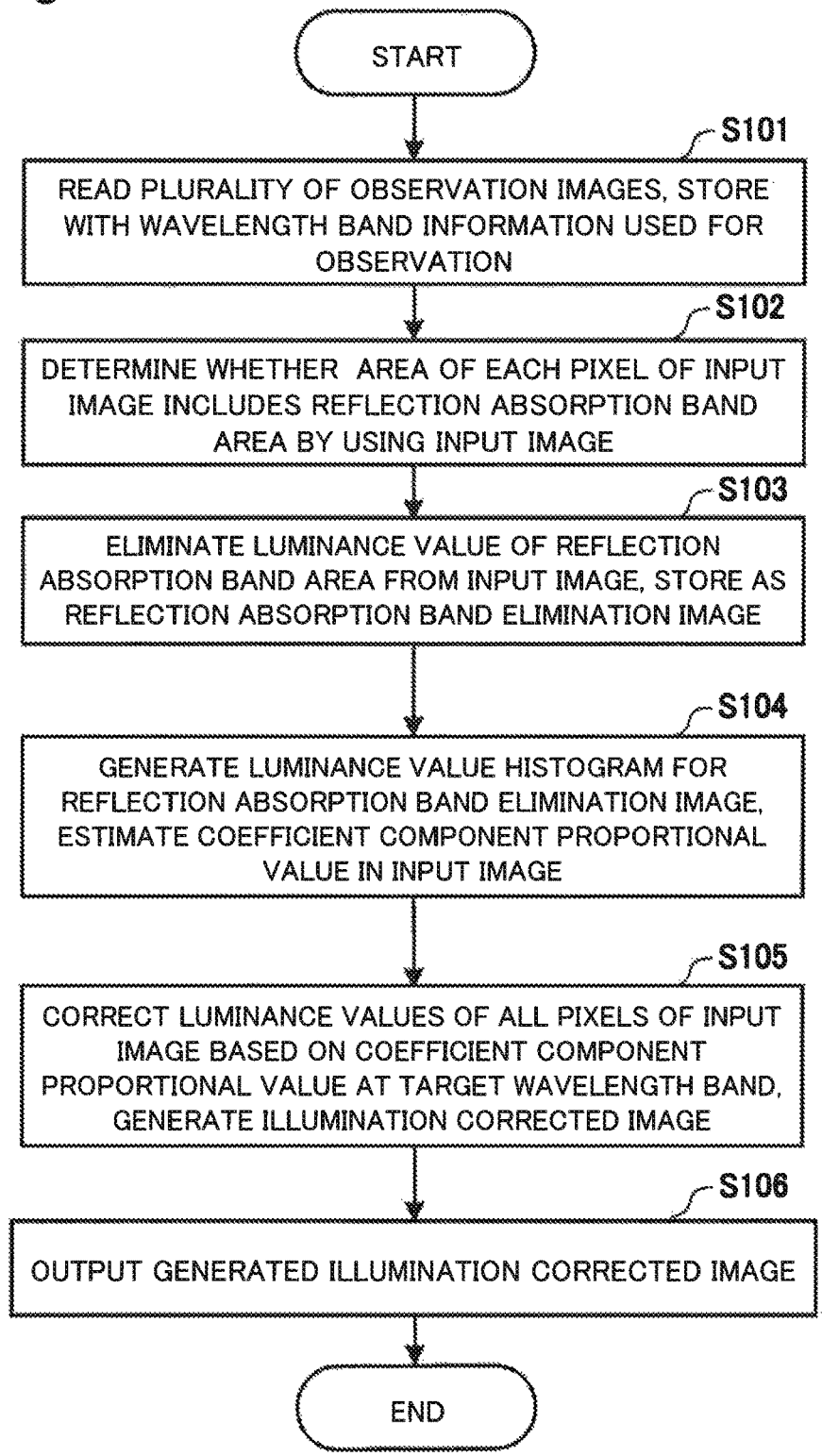
FIG. 4 is a flowchart illustrating one example of an operation of the image processing device in the first example embodiment.

Next, an operation of the image processing device 10 in the present example embodiment is described. FIG. 4 is a flowchart illustrating one example of an operation of the image processing device 10 in the present example embodiment. In the example illustrated in FIG. 4, first of all, the image reading unit 11 reads, from the external device 101, the observation image which holds an observation result at a predetermined wavelength band in each pixel, and stores the read observation image together with wavelength band information used for observation, as the input image (Step S101). The image reading unit 11 may read, from the external device 101, a plurality of observation images for each wavelength band at which observation is performed, and measurement environment information including wavelength band information of each of the observation images, for example. Further, the image reading unit 11 stores a plurality of read observation images in association with at least wavelength band information by which the observation images are observed. Herein, each of observation images associated with a plurality of stored wavelength bands is output to a processing unit on a post stage (the reflection absorption band area elimination unit 12 and the illumination correction unit 13) as the input image. Note that when the wavelength band used for observation of each observation image is known, wavelength band information may not be stored. In the present example, it is assumed that the observation image to be read is images (N images) within a substantially same area on the earth's surface observed at N different wavelength bands.

Next, the reflection absorption band area elimination unit 12 determines whether an area associated with each pixel of the input image, which is output from the image reading unit 11, and which holds the observation result at the different wavelength band in each pixel is an area including a reflection absorption band area (Step S102).

Next, the reflection absorption band area elimination unit 12 generates, from each input image, an image in which the luminance value of the pixel which is determined to include the reflection absorption band area is eliminated, and stores the generated image as the reflection absorption band area elimination image (Step S103).

Next, the illumination correction unit 13 (more specifically, the coefficient component proportional value calculating unit 131) generates the luminance value histogram with respect to each of reflection absorption band area elimination images for each wavelength band, and calculates the coefficient component proportional value $\alpha_{est}(\lambda)$ based on a generated histogram (Step S104).

Next, the illumination correction unit 13 (more specifically, the coefficient component elimination unit 132) divides values of all pixels of each input image with use of the coefficient component value $\alpha(\lambda)$, which is determined based on the coefficient component proportion value calculated with respect to the wavelength band of the input image, and stores a result of the division as an illumination corrected image at the wavelength band (Step S105).

Lastly, the illumination correction unit 13 outputs an illumination corrected image at each generated wavelength band to the output device 102 (Step S106).

As described above, according to the present example embodiment, it is possible to stably generate a highly accurate illumination corrected image from an input observation image without storing a value relating to the environmental fluctuation component such as an atmospheric transmittance for each wavelength in advance.

The reason for this is as follows. When many objects having a high reflectance or a low reflectance only in a certain wavelength band such as vegetation within the observation area on the earth's surface present, the number of pixels having a high pixel value or a low pixel value is large only in an image having the certain wavelength band, out of N observation images, as compared with an image having a wavelength band other than the certain wavelength band. When the proportional value of the coefficient component (this includes a product of an illumination component and an atmospheric transmittance, for example) is calculated from the luminance value histogram of the observation image for each wavelength band by using the aforementioned image as it is, there may occur a situation that it is difficult to accurately obtain a coefficient component proportion value due to an influence of the pixel including the object. In the present example embodiment, however, a step for avoiding such situation is included. Specifically, according to the present example embodiment, it is possible to avoid such situation, and to stably calculate the coefficient component proportional value (more specifically, the luminance value of the pixel which is supposed to have a maximum reflectance within the input image). Consequently, according to the present example embodiment, it is possible to stably generate a highly accurate illumination corrected image.

Note that in the aforementioned example embodiment, there is described a case where one observation image holds an observation result by one wavelength band in the pixel value of each pixel, as an example. However, for example, one observation image may hold observation results by observation with respect to a plurality of wavelength bands as the pixel value of each pixel. For example, when the observation image can hold the pixel value of 2 bytes for each pixel, an image format may be that a former half of the 2-byte data i.e. 1-byte data holds the observation result with respect to a first wavelength band, and a latter half of the 2-byte data i.e. 1-byte data holds the observation result with respect to a second wavelength band. Note that in the aforementioned case, it is regarded that two observation images are input as the input image in the image processing device for each wavelength band.

Second Example Embodiment

Figure 5:
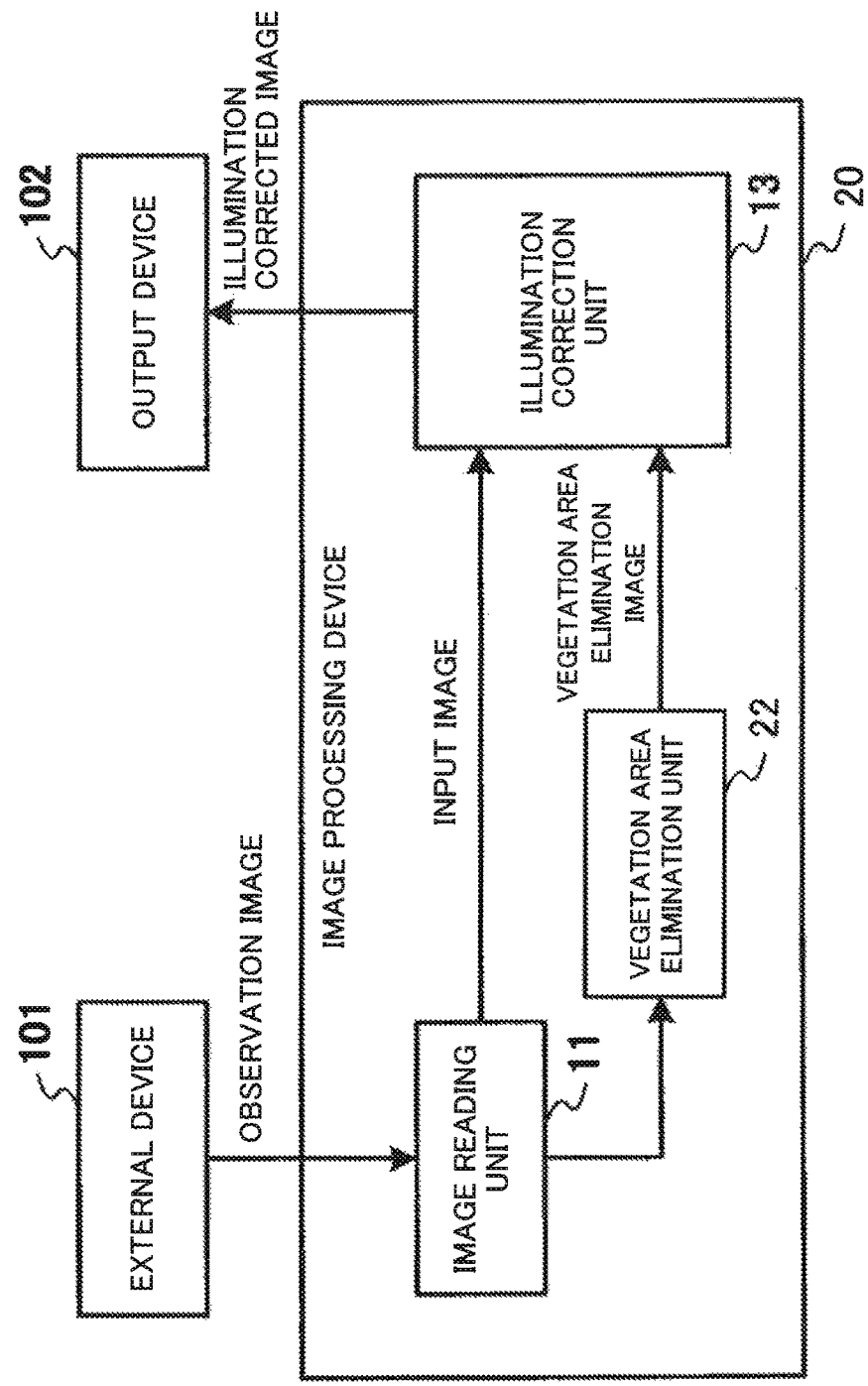
FIG. 5 is a block diagram illustrating a configuration example of an image processing device in a second example embodiment.

Next, the second example embodiment of the present invention is described. FIG. 5 is a block diagram illustrating a configuration example of an image processing device 20 in the second example embodiment of the present invention. In the present example embodiment, an image processing device for discriminating and eliminating from the input image, specifically, the vegetation area as the reflection absorption band area is described. In the following, the same elements as those of the first example embodiment are indicated with the same reference numerals, and description thereof is omitted.

The image processing device 20 illustrated in FIG. 5 includes the image reading unit 11, a vegetation area elimination unit 22, and the illumination correction unit 13. Further, the image processing device 20 is connected to the external device 101 and the output device 102. The image processing device 20 of the present example embodiment is different from the image processing device 20 of the first example embodiment illustrated in FIG. 1 in a point that the vegetation area elimination unit 22 is provided in place of the reflection absorption band area elimination unit 12.

In the present example embodiment, it is assumed that the external device 101 holds the observation image associated with two or more different wavelength bands including at least a red wavelength band (e.g. a band including at least a part of a wavelength range from 620 nm to 750 nm), and a near infrared wavelength band (e.g. a band including at least a part of a wavelength range from 750 nm to 1050 nm).

Further, the image reading unit 11 inputs the aforementioned observation image associated with two or more different wavelength bands including the red wavelength band and the near infrared wavelength band. Note that also in the present example embodiment, the number of wavelength bands associated with an input observation image is described as N.

The vegetation area elimination unit 22 determines whether the area on the earth's surface associated with each pixel of the observation image (input image), which is input by the image reading unit 11 and is associated with N different wavelength bands, is an area including vegetation (vegetation area). Further, the vegetation area elimination unit 22 stores an image in which the luminance value of the pixel corresponding to the vegetation area is eliminated, as a vegetation area elimination image with respect to each input image.

For example, the vegetation area elimination unit 22 may calculate a normalized difference vegetation index $I_j$ based on the aforementioned Eq. (4) with use of the luminance value $L_j(\lambda_R)$ associated with the wavelength band corresponding to red light, and the luminance value $L_j(\lambda_{NIR})$ associated with the wavelength band corresponding to near infrared light, out of N luminance values $L_j(\lambda_1), \ldots, L_j(\lambda_N)$, which are obtained from a j-th pixel of each input image and are associated with N wavelength bands. Further, when the calculated normalized difference vegetation index $I_j$ is larger than a predetermined value, the vegetation area elimination unit 22 may determine that the j-th pixel related to the vegetation area. The vegetation area elimination unit 22 may determine whether each pixel of the input image related to the vegetation area by performing the aforementioned process with respect to all pixels constituting the input image.

Note that when photographic areas of the input image associated with a red wavelength band and a near infrared wavelength band are not the same, the vegetation area elimination unit 22 may perform a process of extracting the luminance value of the pixel which is supposed to be located at a same position on the earth's surface in each input image, in place of a process of extracting the luminance value of the pixel at a same position in each input image.

Note that as well as the reflection absorption band area elimination unit 12 in the first example embodiment, the vegetation area elimination unit 22 may use SAVI, RVI, NRVI, TVI, CTVI, TTVI, EVI, NDWI, NDSI or NHFD, or any other arbitrary index, in place of a normalized difference vegetation index. Note that the image reading unit 11 may read the observation image including the observation value of a wavelength band necessary for obtaining an index to be used by the vegetation area elimination unit 22 depending on the index.

Further, the illumination correction unit 13 calculates the coefficient component proportional value $\alpha_{est}(\lambda)$ of each input image with use of the vegetation area elimination image, which is generated by the vegetation area elimination unit 22 and is associated for each wavelength band, corrects each input image based on the calculated proportional value $\alpha_{est}(\lambda)$, and generates an illumination corrected image. Note that an operation of the illumination correction unit 13 is the same as in the first example embodiment except for a point that the reflection absorption band elimination image is replaced by a vegetation area elimination image.

Figure 6:
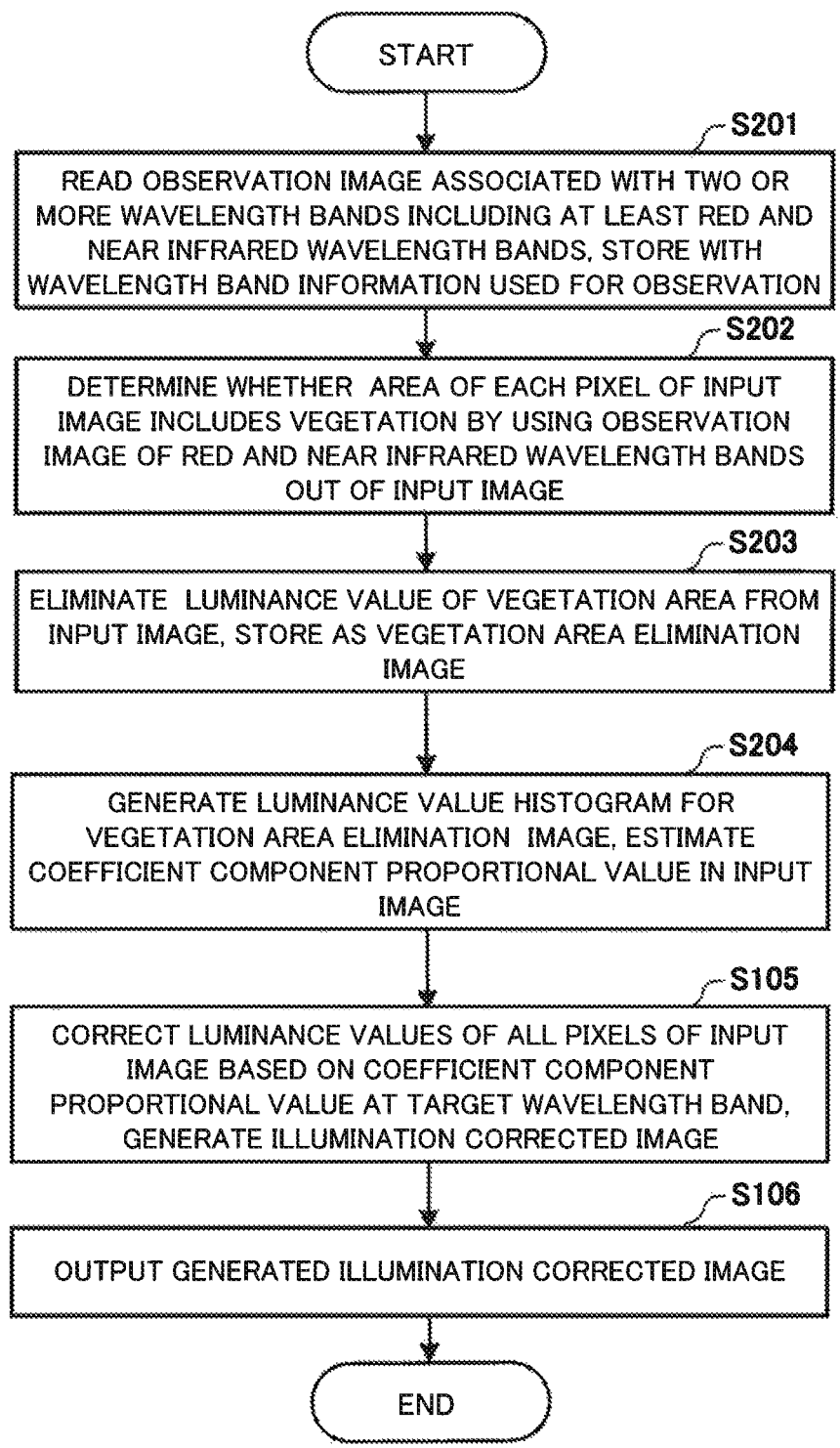
FIG. 6 is a flowchart illustrating one example of an operation of the image processing device in the second example embodiment.

FIG. 6 is a flowchart illustrating one example of an operation of the present example embodiment. The flowchart illustrated in FIG. 6 is different from the flowchart illustrating an operation of the first example embodiment illustrated in FIG. 4 in a point that operations of Step S101 to Step S104 are replaced by Step S201 to Step S204.

In the present example embodiment, the image reading unit 11 reads the observation image associated with two or more wavelength bands including at least red and near infrared wavelength bands, and stores the read observation image together with wavelength band information used for observation (Step S201).

Next, the vegetation area elimination unit 22 determines whether an area of each pixel in each input image includes vegetation with use of the observation image by red and near infrared wavelength bands out of the input image (Step S202).

Next, the vegetation area elimination unit 22 eliminates the luminance value of a vegetation area from each of input images, and stores an image in which the luminance value is eliminated as a vegetation area elimination image (Step S203).

Next, the illumination correction unit 13 generates the luminance value histogram for each of vegetation area elimination images, and estimates the coefficient component proportional value $\alpha_{est}(\lambda)$ in each input image (Step S204).

Note that the second example embodiment is the same as the first example embodiment regarding the other points.

As described above, also by the present example embodiment, it is possible to stably generate a highly accurate illumination corrected image from an input observation image, even when a value relating to the environmental fluctuation component such as an atmospheric transmittance for each wavelength is not stored in advance.

The reason for this is as follows. Even when the observation image on the earth's surface including a lot of vegetation having a high reflectance in a near infrared wavelength band is input to the image processing device 20, the vegetation area elimination unit 22 generates the vegetation area elimination image in which vegetation is eliminated, and the illumination correction unit 13 calculates the coefficient component proportional value with use of the vegetation area elimination image. Thereby, it is possible to avoid a situation that it is difficult to accurately obtain the coefficient component proportion value due to an influence of vegetation, and to stably calculate the coefficient component proportional value. Consequently, a more accurate illumination corrected image is stably generated.

Note that the image processing devices of the aforementioned example embodiments can be respectively implemented by a computer, a program which controls a computer, and a dedicated hardware; or combination of a computer, a program which controls a computer, and a dedicated hardware.

Figure 7:
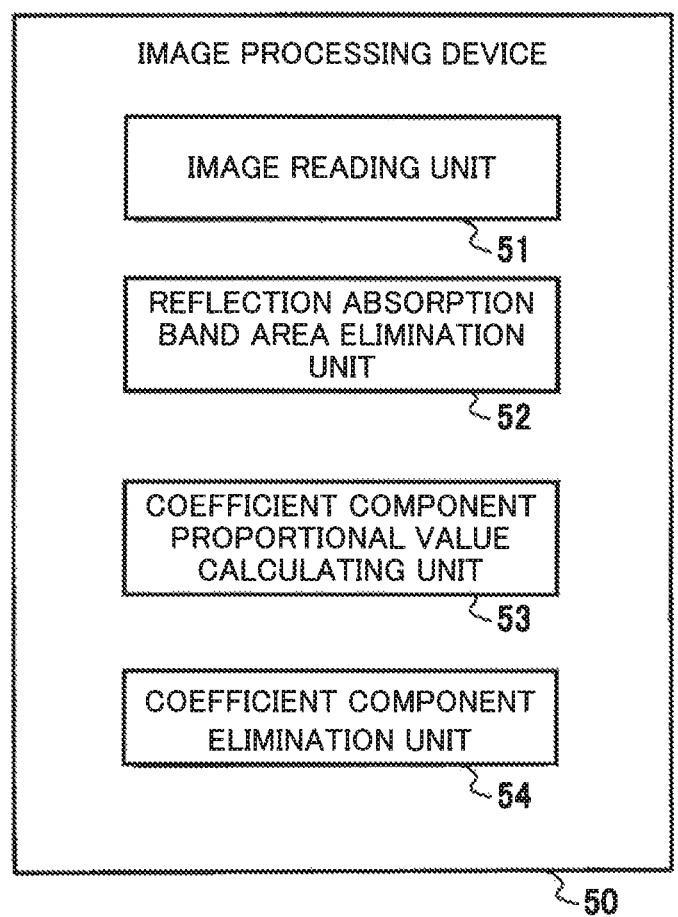
FIG. 7 is a block diagram illustrating another configuration example of an image processing device according to the present invention.
Figure 8:
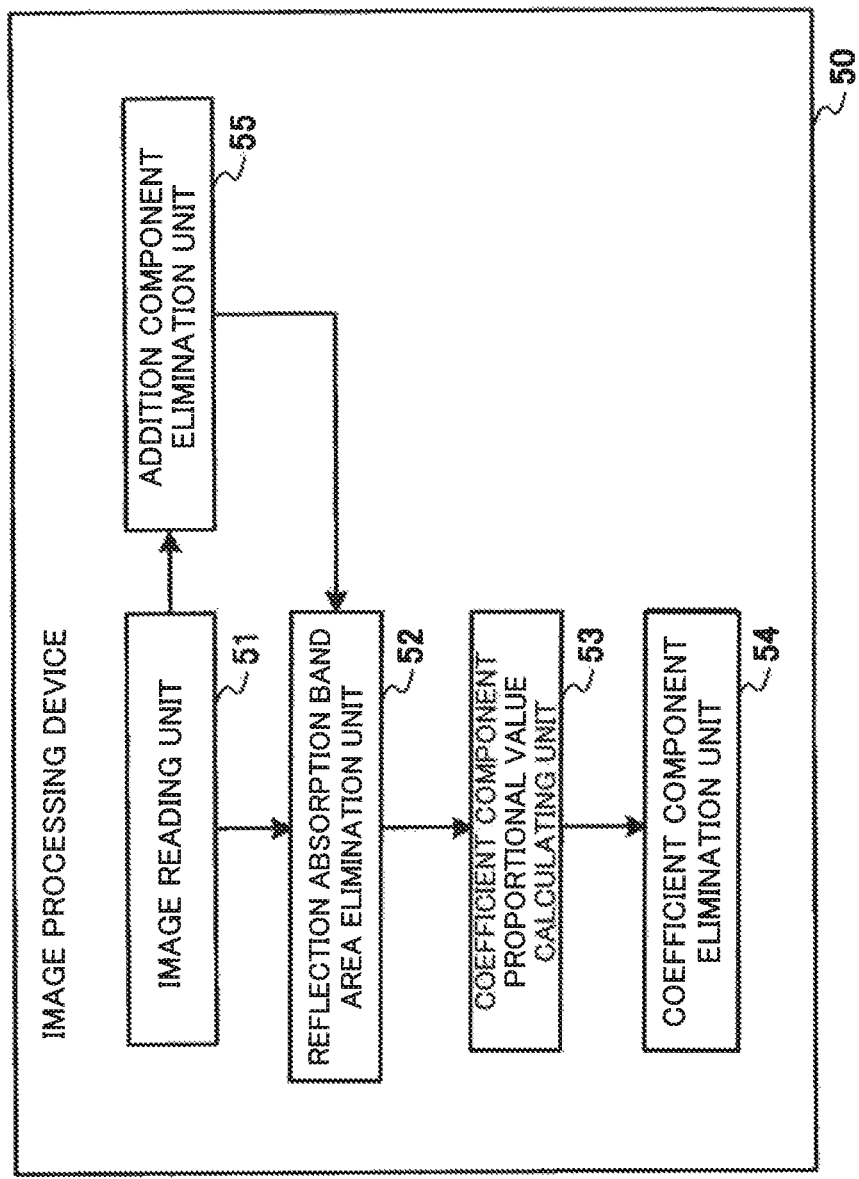
FIG. 8 is a block diagram illustrating another configuration example of an image processing device according to the present invention.
Figure 9:
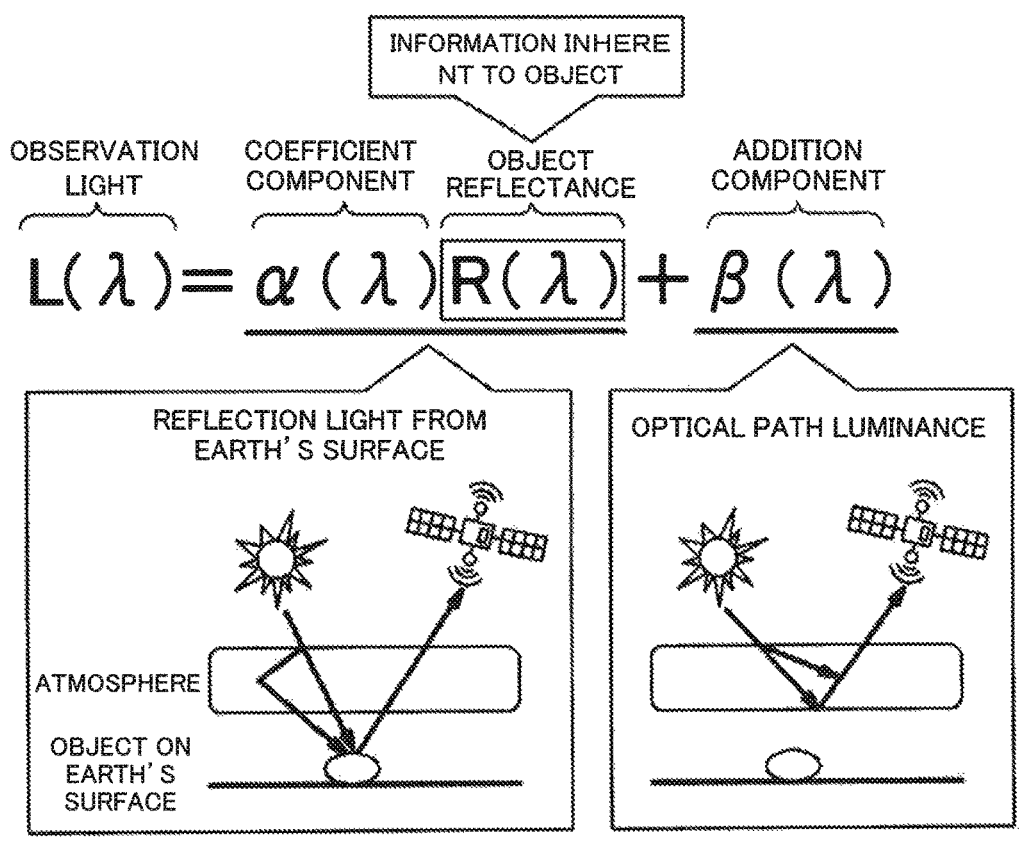
FIG. 9 is an explanatory diagram illustrating a relationship between observation light, and a coefficient component and an addition component in an aerial photographic image.

Further, FIG. 7 and FIG. 8 are block diagrams illustrating other configuration examples of an image processing device according to the present invention. As illustrated in FIG. 7, an image processing device 50 according to the present invention may include an image reading unit 51, a reflection absorption band area elimination unit 52, a coefficient component proportional value calculation unit 53, and a coefficient component elimination unit 54.

The image reading unit 51 reads one or more observation images which hold an observation result by one or a plurality of wavelength bands as the pixel value of the pixel associated with a position of the observation target area.

The reflection absorption band area elimination unit 52 eliminates, from each of one or more observation images, an observation result with respect to the reflection absorption band area being an area including the observed object having the reflection band or the absorption band within the observation wavelength band, and generates the reflection absorption band elimination image.

The coefficient component proportional value calculation unit 53 obtains a proportional value of a coefficient component which appears in an observation value by the wavelength band, and which is a component proportional to a reflectance of the observed object and includes a component relating to at least one of illumination and an atmospheric transmittance, with use of the reflection absorption band elimination image, for each wavelength band used for observation of one or more observation images.

The coefficient component elimination unit 54 eliminates the coefficient component from each observation value included in one or more observation images, based on the coefficient component proportional value for each wavelength band, and generates an illumination corrected image.

Further, in the aforementioned configuration, when observation values by different wavelength bands included in one or more observation images and associated with pixels having mutual correlation include an observation value which is different from an observation value by another one of the wavelength bands by a predetermined amount or more, the reflection absorption band area elimination unit may eliminate all observation results held as the pixel value of the pixel from the one or more observation images by assuming that the target pixel is the pixel which holds an observation result with respect to the reflection absorption band area, and may generate the reflection absorption band elimination image.

Further, the observation image may be an image which holds an observation result to be obtained by observing the earth's surface respectively as the luminance value of the pixel associated with an area on the earth's surface being the observation target area. The reflection absorption band area elimination unit may determine whether or not an area on the earth's surface included in one or more observation images and associated with pixels having mutual correlation is an area including a specific object on the earth's surface, and may eliminate the luminance value of the pixel associated with an area including the specific object on the earth's surface from the one or more observation images, based on a determination result.

Further, the reflection absorption band area elimination unit may determine whether or not an area on the earth's surface included in one or more observation images and associated with pixels having mutual correlation is an area including vegetation, and may eliminate the luminance value of the pixel associated with the area including the vegetation from the one or more observation images, based on a determination result.

Further, the reflection absorption band area elimination unit may determine whether an area on the earth's surface associated with the target pixel is an area including vegetation, based on a first luminance value being an observation result with respect to a red wavelength band, and a second luminance value being an observation result with respect to a near infrared wavelength band with respect to an area on the earth's surface associated with the target pixel, for each pixel of one or more observation images.

Further, a coefficient component proportional value calculation unit may generate an observation value histogram for each wavelength band used for observation of the observation image, with use of the reflection absorption band area elimination image, and may calculate the observation value in which the cumulative relative frequency in the generated histogram is equal to or larger than a predetermined value, as the coefficient component proportional value at the wavelength band.

Further, as illustrated in FIG. 8, the image processing device 50 according to the present invention may further include an addition component elimination unit 55.

The addition component elimination unit 55 estimates and eliminates an addition component which is included in the observation value with respect to the wavelength band and is a component that is non-proportional to the reflectance of the observed object and includes a component at least relating to an optical path luminance, for each wavelength band used for observation of one or more observation images.

In the aforementioned configuration, the reflection absorption band area elimination unit may eliminate, from each of observation images in which an addition component is eliminated by the addition component elimination unit 55, an observation result held as pixel information associated with the reflection absorption band area, and may generate the reflection absorption band elimination image.

Further, a coefficient component elimination unit may eliminate, from each observation value included in the observation image in which an addition component is eliminated, a coefficient component in a wavelength band at which the observation value is obtained, based on a coefficient component proportional value for each wavelength band, and may generate an illumination corrected image.

Further, a part or all of the aforementioned example embodiments may be described as the following supplementary notes, but are not limited to the following.

(Supplementary Note 1) An image processing device characterized by including: reflection absorption band area elimination unit which eliminates, from one or a plurality of observation images which hold an observation result by two or more different wavelength bands as a pixel value of a pixel associated with a position of an observation target area, an observation result with respect to a reflection absorption band area being an area including an observed object having a reflection band or an absorption band within an observation wavelength band; coefficient component proportional value calculation unit which obtains a proportional value of a coefficient component which appears in an observation value by the wavelength band, which is a component proportional to a reflectance of the observed object, and which includes a component relating to at least one of illumination and an atmospheric transmittance, with use of the reflection absorption band area elimination image being an image in which an observation result with respect to the reflection absorption band area is eliminated from the one or the plurality of observation images, for each wavelength band used for observation of the one or the plurality of observation images; and coefficient component estimating unit which multiplies a predetermined coefficient depending on the observed object by the coefficient component proportional value for each wavelength band, and estimates a value of a coefficient component.

(Supplementary Note 2) The image processing device according to supplementary note 1, wherein when observation values by different wavelength bands included in the one or more observation images and associated with pixels having mutual correlation include an observation value which is different from an observation value by another one of the wavelength bands by a predetermined amount or more, the reflection absorption band area elimination unit eliminates all observation results held as the pixel value of a target pixel from the one or more observation images by assuming that the target pixel is a pixel which holds an observation result with respect to the reflection absorption band area, and generates the reflection absorption band elimination image.

(Supplementary Note 3) The image processing device according to supplementary note 1 or supplementary note 2, wherein an observation image is an image which holds an observation result to be obtained by observing the earth's surface respectively as a luminance value of the pixel associated with an area on the earth's surface being the observation target area, and the reflection absorption band area elimination unit determines whether or not an area on the earth's surface included in the one or more observation images and associated with pixels having mutual correlation is an area including a specific object on the earth's surface, and eliminates a luminance value of the pixel associated with an area including the specific object on the earth's surface from the one or more observation images, based on a determination result.

(Supplementary Note 4) The image processing device according to supplementary note 3, wherein the reflection absorption band area elimination unit determines whether or not an area on the earth's surface included in the one or more observation images and associated with pixels having mutual correlation is an area including vegetation, and eliminates a luminance value of the pixel associated with the area including the vegetation from the one or more observation images, based on a determination result.

(Supplementary Note 5) The image processing device according to supplementary note 4, wherein the reflection absorption band area elimination unit determines whether or not an area on the earth's surface associated with the target pixel is an area including vegetation, based on a first luminance value being an observation result by a red wavelength band, and a second luminance value being an observation result by a near infrared wavelength band with respect to an area on the earth's surface associated with the target pixel, for each pixel of the one or more observation images.

(Supplementary Note 6) The image processing device according to any one of supplementary note 1 to supplementary note 5, wherein the coefficient component proportional value calculation unit generates an observation value histogram for each wavelength band used for observation of the observation image, with use of the reflection absorption band area elimination image, and calculates an observation value in which a cumulative relative frequency in a generated histogram is equal to or larger than a predetermined value, as a coefficient component proportional value at the wavelength band.

As described above, the invention of the present application is described with reference to the example embodiments and examples. The invention of the present application, however, is not limited to the aforementioned example embodiments and examples. The configuration and details of the invention of the present application may be modified in various ways comprehensible to a person skilled in the art within the scope of the invention of the present application.

INDUSTRIAL APPLICABILITY

The present invention is also appropriately applicable to an inspection device and the like for inspecting a material or a surface state of a substance by radiating predetermined light on a target substance and receiving reflection light from the substance, for example, in addition to farming support and searching for resources by using observation of the earth's surface.

This application claims the priority based on Japanese Patent Application No. 2015-108124 filed on May 28, 2015, entire disclosure of which is hereby incorporated.

REFERENCE SIGNS LIST 10, 20, 50 Image processing device
11 Image reading unit
12 Reflection absorption band area elimination unit
13 Illumination correction unit
131 Coefficient component proportional value calculating unit
132 Coefficient component elimination unit
22 Vegetation area elimination unit
101 External device
102 Output device
51 Image reading unit
52 Reflection absorption band area elimination unit
53 Coefficient component proportional value calculation unit
54 Coefficient component elimination unit
55 Addition component elimination unit

What is claimed is:

1. An image processing device comprising:
at least one processor configured to:
read an observation image holding an observation result of an observation target area with respect to one or a plurality of wavelength bands, the observation result being represented as a pixel value of a pixel associated with a position in the observation target area;
replace the pixel value of the pixel related to a reflection absorption band area with a predetermined value and generate a reflection absorption band elimination image, the reflection absorption band area being an area which includes an observed object having a reflection band or an absorption band within an observation wavelength band;
calculate a proportional value of a coefficient component for each wavelength band used for observation of the observation image, the coefficient component being a component which is included in an observation value by the observation with respect to the observation wavelength band and is proportional to a reflectance of the observed object and includes a component relating to at least one of illumination and an atmospheric transmittance; and
eliminate the coefficient component from the observation value included in the observation image based on the proportional value of the coefficient component for each wavelength band, and generate an illumination corrected image.

2. The image processing device according to claim 1, wherein,
when, in the pixel having a plurality of observation values which are obtained by the observation with respect to the mutually different wavelength bands and are associated with the pixel of the observation image as the pixel values, an observation value which is different from the observation value in another wavelength band by a predetermined amount or more is included in the plurality of observation values, at least one processor replaces the pixel values of the pixel having the plurality of observation values with the predetermined values by assuming that the pixel is a pixel related to the reflection absorption band area, and generate the reflection absorption band elimination image.

3. The image processing device according to claim 1, wherein
the observation image is an image holding the observation result obtained by observing the earth's surface as a luminance value of the pixel associated with the area on the earth's surface being the observation target area, and
the at least one processor determines whether the area on the earth's surface included in the observation image and associated with the pixel is an area including a specific object on the earth's surface, and eliminates the luminance value of the pixel associated with the area including the specific object on the earth's surface from the observation image based on a determination result.

4. The image processing device according to claim 3, wherein
the at least one processor determines whether the area on the earth's surface included in the observation image and associated with the pixel is an area including vegetation, and eliminates the luminance value of the pixel associated with the area including vegetation from the observation image based on a determination result.

5. The image processing device according to claim 4, wherein
the at least one processor determines, for each pixel of the observation image, whether the area on the earth's surface associated with the pixel is an area including vegetation based on a first luminance value being the observation result with respect to a red wavelength band, and a second luminance value being an observation result with respect to a near infrared wavelength band.

6. The image processing device according to claim 1, wherein
the at least one processor generates an observation value histogram for each wavelength band used for observation of the observation image, with use of the reflection absorption band elimination image, and calculates an observation value in which a cumulative relative frequency in the generated histogram is equal to or larger than a predetermined value, as the proportional value of the coefficient component in the wavelength band.

7. An image processing method comprising:
by at least one processor,
reading an observation image holding an observation result of an observation target area with respect to one or a plurality of wavelength bands, the observation result being represented as a pixel value of a pixel associated with a position in the observation target area;
replacing the pixel value of the pixel related to a reflection absorption band area with a predetermined value and generating a reflection absorption band elimination image, the reflection absorption band area being an area which includes an observed object having a reflection band or an absorption band within an observation wavelength band;
calculating a proportional value of a coefficient component for each wavelength band used for observation of the observation image, the coefficient component being a component which is included in an observation value by the observation with respect to the observation wavelength band and is proportional to a reflectance of the observed object and includes a component relating to at least one of illumination and an atmospheric transmittance; and
eliminating the coefficient component from the observation value included in the observation image based on the proportional value of the coefficient component for each wavelength band, and generating an illumination corrected image.

8. A non-transitory computer readable program recording medium recording a program causing a computer to execute:
reading an observation image holding an observation result of an observation target area with respect to one or a plurality of wavelength bands, the observation result being represented as a pixel value of a pixel associated with a position in the observation target area;
replacing the pixel value of the pixel related to a reflection absorption band area with a predetermined value and generating a reflection absorption band elimination image, the reflection absorption band area being an area which includes an observed object having a reflection band or an absorption band within an observation wavelength band;
calculating a proportional value of a coefficient component for each wavelength band used for observation of the observation image, the coefficient component being a component which is included in an observation value by the observation with respect to the observation wavelength band and is proportional to a reflectance of the observed object and includes a component relating to at least one of illumination and an atmospheric transmittance; and eliminating the coefficient component from the observation value included in the observation image based on the proportional value of the coefficient component for each wavelength band, and generating an illumination corrected image.

* * * * *